United States Patent [19]

Tsao et al.

[11] Patent Number: 5,678,353
[45] Date of Patent: Oct. 21, 1997

[54] GRASS GUARD

[76] Inventors: Emily Tsao; Chein-Hwa Tsao, both of 5853 Antigua Dr., San Jose, Calif. 95120-1760; Stephen K. Chan, 493 Hanley Dr., Pinole, Calif. 94564

[21] Appl. No.: 370,432

[22] Filed: Jan. 9, 1995

[51] Int. Cl.$^6$ ................................. A01G 13/02
[52] U.S. Cl. ............................... 47/25; 47/9
[58] Field of Search .................. 47/25, 25 R, 9 S, 47/9 R

[56] References Cited

U.S. PATENT DOCUMENTS

| | | | |
|---|---|---|---|
| 1,554,865 | 9/1925 | Magoon | 47/25 |
| 3,704,004 | 11/1972 | Carter, Jr. | 47/25 R |
| 3,762,642 | 10/1973 | Di Santo . | |
| 3,857,195 | 12/1974 | Johnson | 47/25 R |
| 3,904,120 | 9/1975 | Sbicca . | |
| 4,146,181 | 3/1979 | Soos . | |
| 5,037,030 | 8/1991 | Apodaca . | |
| 5,171,390 | 12/1992 | Travers | 47/84 C |
| 5,211,338 | 5/1993 | Leite et al. . | |

FOREIGN PATENT DOCUMENTS

| | | | |
|---|---|---|---|
| 2665821 | 2/1992 | France | 47/25 R |
| 2686482 | 7/1993 | France | 47/25 R |

*Primary Examiner*—Terry Lee Melius
*Assistant Examiner*—Joanne C. Downs
*Attorney, Agent, or Firm*—Carl D. Titus; James J. Leary; Leary, Titus & Aiello

[57] ABSTRACT

A grass guard for forming a vegetationless border around a perimeter of an object, such as a lawn sprinkler head, is described. One particular embodiment consists of a two layer construction. The top layer is a plastic sheet simulating grass. The bottom layer is made of a heavy grit bonded into a uniform body with a polymer. The layers form a relatively thin, weather resistant, plastically compliant disk with a center hole for stretch, self-adjusting fit over a pre-installed sprinkler head. The device is also easily cut through with a knife to fit various head locations. The bottom layer has an outside vertical edge with a top rounded corner enclosing the top layer to prevent edge delamination or fraying. An adhesive is provided to bond the grass guard to the neck of the sprinkler head to eliminate gap formation around the head. A hammering board can be used to facilitate the installation. Optionally, pre-watering the vicinity of the sprinkler head until the ground is softened from moisture further simplifies the installation and enhances the quality. In general, the device can be used to guard against the growth of vegetation next to any physical objects with the proper tailoring of geometry and choice of associated manufacturing process.

15 Claims, 3 Drawing Sheets

Fig. 1A
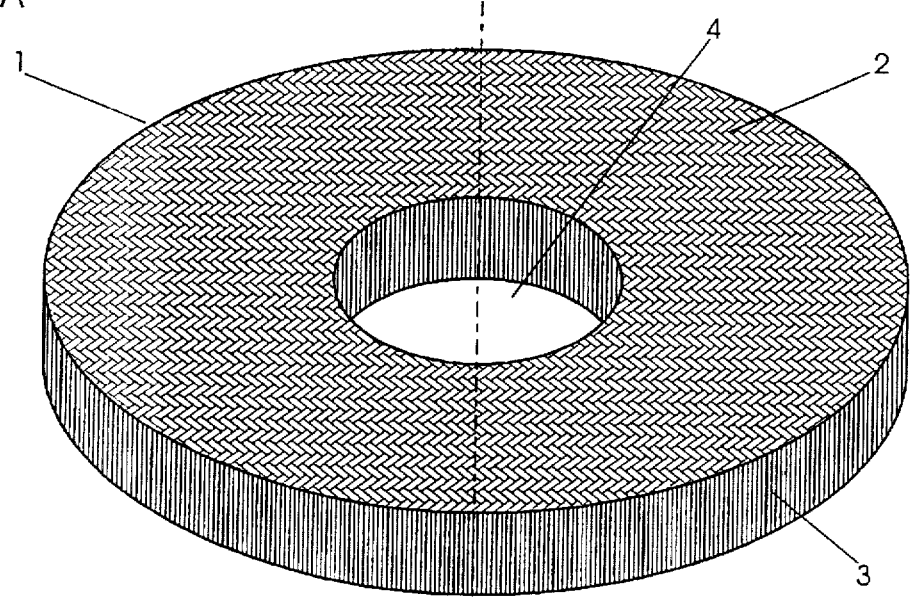
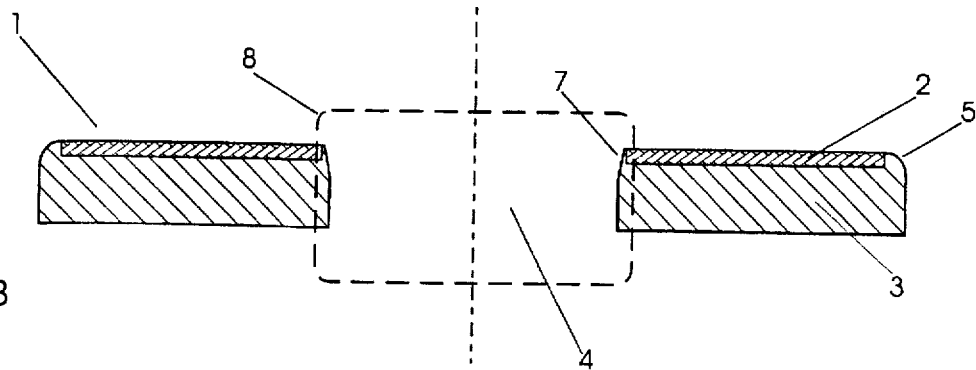
Fig. 1B
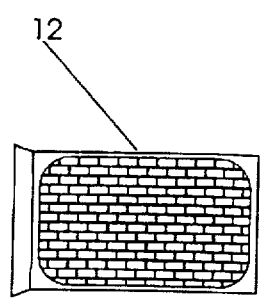
Fig. 1C
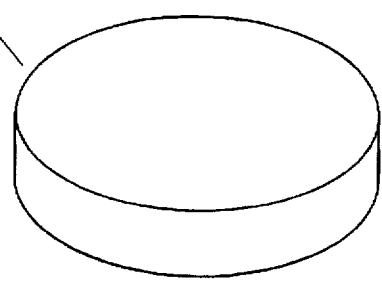
Fig. 1D

GRASS GUARD

BACKGROUND OF THE INVENTION

1. Field of the Invention

The field of the invention pertains to a new and improved grass guard for objects such as sprinkler heads, fire hydrants, utility boxes, poles, etc. where the device is arranged to be easily installable around a pre-installed object to minimize vegetation growth around the object. Furthermore, the grass guard is easily removable for any service work on the object and afterwards reusable as well.

2. Description of the Prior Art

Sprinkler heads that are mounted more or less flush with the ground surface typically suffer from vegetation overgrowth in their immediate vicinity. The overgrowth will first block the watering jet causing local brown out of the lawn. Additionally, the same blockage in turn causes accelerated growth which could render the sprinkler head invisible. This could lead to destruction of the pop up type head by a lawn mower as the poppet sometimes fails to retract from its raised position after watering due to aging of the associated parts or simply dirt. Accordingly, there have been several inventions in this field which have tried to solve these problems. The following prior art is cited for reference.

U.S. Pat. No. 3,762,642 to Di Santo sets forth a grass guard to surroundingly protect a sprinkler head relative to vegetation growth employing complementary pieces removably engaged for easy and quick installation and removal for service or replacement. Here, the key problem is difficult installation at edges and corners of the lawn due to the complicated spatial relationship between the engagement lines and the trimming lines to fit the border geometry. Additionally, the engagement areas are prone to damage under the condition of ground settling and trafficking objects.

U.S. Pat. No. 3,904,120 to Sbicca sets forth a grass guard made of a molded one-piece pliant thick plastic disk recessed into the ground. The top surface supports grass simulating protrusions. A keeper ring is included in direct engagement with the underside of the radially flanged sprinkler head and is sufficiently pliant to permit assembly of the disk over an installed head. However, there are flangeless heads which would render this design unworkable. Further, there are other heads whose flange is quite thick vertically. This would result in a product with excessive overall thickness thus too expensive. It will be too hard to install due to the excessive depth of digging. This problem is aggravated by the fact that forced installation of a thick disk over the head requires the disk to be tilted with respect to the head which necessitates even more digging of a slanted area which must be refilled at the end of installation for device stability.

U.S. Pat. No. 4,146,181 to Soos sets forth a grass guard of frustoconical skirt extending outwardly and downwardly from close to the top edge of the sprinkler head. At the bottom of the device are radially extending Found engaging and stabilizing fins. Like U.S. Pat. No. 3,762,642 to Di Santo, corner and edge locations of the head are not considered. As a result, the implied cutting operation through the body and fin structure makes it difficult to install as well.

U.S. Pat. No. 5,037,030 to Apodaca sets forth a grass guard featuring a stackable head guard with registration pins. The central bore has a knocked out section to accommodate a larger head diameter. Further, the top block may contain an absorbed chemical to limit growth of vegetation. Like before, corner and edge locations of the head are not considered, making installation difficult. Additionally, the absorbed chemical is potentially dangerous to the environment and people, and the chemical cannot be expected to last long under a variety of weather conditions.

U.S. Pat. No. 5,211,338 to Leite, et at., sets forth a grass guard featuring a frangible plate to accommodate for edge and corner locations of the head. The device also has adhesively attached spikes into the ground for stabilization. The problem of this device is its propensity to breakage along the frangible features under condition of trafficking objects especially when the ground is soft (e.g., wet). Further, a fairly small number of frangible features are still not flexible enough to cover all locations of the sprinkler head (e.g., offset from edge and corner) unless a tremendous number of frangible features were used which would render the device too fragile to be useful anyway.

As such, it may be appreciated that there continues to be a need for a new and improved grass guard which addresses the needs of ease of installation, as well as versatility in reliable application to a variety of surface and vegetation conditions while allowing low cost production and in this respect, the present invention substantially fulfills this need.

SUMMARY OF THE INVENTION

In view of the foregoing disadvantages and problems inherent in the known types of grass guards now present in the prior art, the present invention provides a grass guard which has all the advantages of the prior art yet none of the disadvantages. Geometrically, the present invention is a relatively thin, plastically compliant disk with a center hole for interference fit over an existing sprinkler head. The structure is a two layer construction with the top layer being a thin, weaved flexible plastic sheet simulating normal grass. The bottom layer is made of a heavy grit or powder, for example sand, bonded into a uniform, plastically compliant body with a polymer which simultaneously forms a tight bond with the top layer. Therefore the structure will conform, without delamination, to a variety of vegetation and ground surface conditions including ground settling under trafficking objects. The materials are selected or formulated to be weather resistant as well. An adhesive is provided to seal any gap between the neck of the sprinkler head and the center hole of the grass guard. This is important to guard against any vegetation growth through the gap. The gap might either be present at installation due to geometric tolerance or developed due to long term material stretch throughout the service life of the device. This is especially serious for edge and corner locations wherein not much device material is left around the neck of the sprinkler head after installation. These factors make for a very reliable grass guard. With the materials being either flexible or plastically compliant and the device relatively thin, the center hole of the device can be easily stretched over an existing sprinkler head with a common tool like a screw driver. Furthermore, the device is easily trimmable with a knife to fit a variety of edge or corner locations of the sprinkler head. By watering the ground till it softens from moisture before installation, the user can simply pull out the grass with roots to clear the vicinity of the sprinkler head without the need to dig a depression to seat the grass guard. This is because the user can easily drive the relatively thin device into the ground with a hammer and hammering board. Additionally, the moist dirt will form a quality seam around the circumference of the grass guard as it is driven downwards. This will prevent edge fraying later. These factors make for an easily installable grass guard. The materials are selected or formulated to be low cost. In combination with the relatively thin structure, they make for a very low cost device which is critical for wide acceptance by the mass market.

As it can be seen, the present invention includes not only all the aforementioned design features, it also includes the particular combination of these features and the associated installation steps herein disclosed and claimed and it is distinguished from the prior art in this particular combination for the functions specified.

The key elements of the invention have been broadly outlined to facilitate understanding and appreciation of the derailed description and contribution to the art later. Additional elements of the invention will be described to form the subject matter of the claims appended hereto. Those skilled in the art will appreciate that the conception, upon which this application is based, may be readily utilized as a basis for the design of other structures, methods and procedures to carry out the purposes of the present invention. Therefore, the claims should be regarded as including such equivalent constructions insofar as they do not depart from the spirit and scope of the present invention. Furthermore, the abstract is neither intended to define the invention of the application, which is measured by the claims, nor is it intended to be limiting as to the scope of the invention in any way.

It is therefore an objective of the present invention to provide a new and improved grass guard for a sprinkler head which has all the advantages of the prior art grass guards and none of the disadvantages.

A second objective of the present invention is to provide a new and improved grass guard which may be manufactured with very low cost while possessing all the anticipated quality, material safety and function for ready commercialization into a volume product.

A third objective of the present invention is to provide a new and improved grass guard with associated apparatuses and methods for ease of installation by the end user. Additionally, the same provides for total device functionality and long term reliability.

A fourth objective of the present invention is to provide a new and improved grass guard which has long term functional reliability throughout its service life under a variety of weather and trafficking conditions.

A fifth objective of the present invention is to provide a new and improved family of grass guards wherein an individual member would have a fixed combination of nominal inside and outside diameters to fit a small range of sprinkler head diameters while a different member having another fixed combination of nominal inside and outside diameters would be used to accommodate a large variation of sprinkler head diameters.

A sixth objective of the present invention is to provide a new and improved grass guard which is easily removable from the sprinkler head for service of the sprinkler system and afterwards reusable as well.

For a better understanding of the present invention, its operating advantages and the specific objectives achieved by its use, reference should be made to the accompanying drawings and descriptions illustrating the preferred embodiments.

BRIEF DESCRIPTION OF THE DRAWINGS

The present invention will be better understood and objectives other than those stated above will become apparent when consideration is given to the following detailed description which makes reference to the enclosed drawings:

FIGS. 1A is an isometric illustration of the grass guard body of the present invention.

FIGS. 1B is a sectional view of the grass guard body.

FIGS. 1C is the adhesive.

FIGS. 1D is the hammering board.

DESCRIPTION OF THE PREFERRED EMBODIMENT

Figure 2:
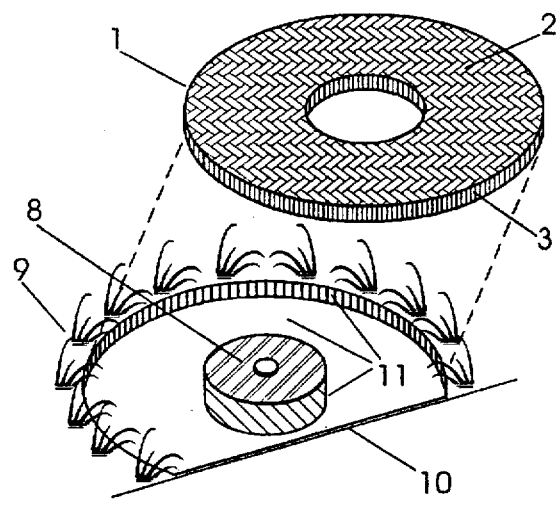
FIG. 2 illustrates isometrically the first step of the installation procedure.
Figure 3:
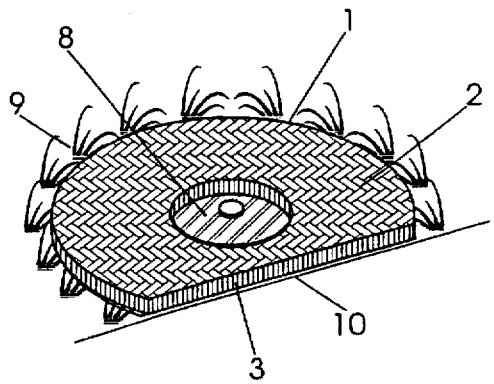
FIG. 3 illustrates isometrically the second step of the installation procedure.

FIGS. 1A–D illustrate the structural details, plus associated installation materials and tools of the present invention. The grass guard 1 is a two layer construction with the top layer 2 being a separate, very low cost pre-manufactured weaved plastic turf sheet taking advantage of the cost benefit of any one of the many existing volume products, for both tooling and piece part cost. Furthermore, the under surface of the top plastic sheet 2 is quite uneven and rough. The material used for the top plastic sheet 2 is flexible and extremely weather resistant (for example low density polyethylene) and has a color and surface texture matching those of normal grass.

The bottom layer 3 is made of a heavy grit or powder bonded into a uniform, plastically compliant body with a polymer. In one specific embodiment, the heavy grit is sand. Here, the preferred material is to be extremely weather resistant and colorwise matching the grass as well. An extremely strong bond is formed between the layers 2 and 3 in the product as: (a) the polymer molecular structure of the bottom layer 3 is compatible with polyethylene chemistry and (b) the polymer chain backbone of the bottom layer 3 is inherently pliant which conforms to the uneven and rough undersurface of the top plastic sheet 2, thereby increasing chemical bonding areas and mechanical bonding contacts resulting in enhanced adhesion strength as a whole.

The following polymeric materials can be used in the formulation of the present invention: Polyvinyl butyral, polyvinyl acetate, polyvinyl alcohol, acrylic, ethylene-vinyl-acetate, plasticized polyvinyl chloride, vinylidene chloride, polyurethane, silicone, polyamide, epichlorohydrin rubber, styrene-butadiene, butadiene-styrene-vinyl pyridine, butadiene-acrylonitrile, chloroprene-dichlorobutadiene, silicone-polyether, polyisoprene, nitrile rubber, butyl rubber, natural rubber, fluorocarbon elastomers and terpolymers of ethylene-propylene-diene monomers. For example, the low viscosity hot melt of copolymers of ethylene and vinyl acetate can be readily blended with inorganic grits using one of several processes. Other materials which are suitable in the hot melt approach being polyvinyl alcohol, elastic polyamide, polyvinyl butyral, plasticized polyvinyl chloride and polyurethane. Hard inorganic grits, for example sand, which normally have much higher densities than polymers serve the dual functions of a dead weight holding the plastic turf edges flush with the ground surface and, since the grits are discrete particles uniformly dispersed in a soft polymeric medium, the flexibility of the body of the present invention is preserved. This material design sets apart the present invention from the prior art U.S. Pat. No. 3,904,120 (Sbicca) which used a lightweight rigid filler like fiberboard embedded in polyurethane. Sbicca had the following drawbacks. There, cutting through the body of the grass guard to make it conform to the narrow geometry of sprinkler heads located close to curb, could be better done if the whole piece was sawn on a work bench rather than cutting it in situ, i.e. on the soft ground soil. It is very difficult to cut through a rigid fiberboard laying on the soft ground soil. Thus, the prior art specified lightweight fiberboard because the heavier the board was, the harder it would be and more difficult to cut during installation. However, in doing so Sbicca sacrificed the weight gain by specifying lightweight fillers. On the contrary, the present invention maximizes the weight with heavy grits to keep the edges flush with the ground surface under trafficking objects like people or a lawn mower. Since the discrete grit particles are suspended uniformly in the soft polymer medium, a simple kitchen knife can cut right through the soft body, in situ, for close conformance to the required narrow geometry should the sprinkler head be located close to the curb. Compared with Sbicca which specifies non-flexible fillers, the present invention has the distinct advantage of easy installation for all types of sprinkler head locations. Furthermore, from the point of view of mechanical weight bearing, the uniformly distributed hard grit within a soft body upholds load bearing evenly and as a result, the composite body as a whole can bear a lot more weight load. In fact, during field test the present invention can easily support a person standing on it without any indentation. Sbicca explained that its non-flexible fillers would add rigidity to the product and henceforth the implication of load bearing. Whereas, the present invention has proven that good load bearing can be achieved with a different approach plus additional advantages.

The present formulation can also be made from the acrylic family. Acrylic plastics comprise a broad array of polymers and copolymers in which the major monomeric constituents come from two families of esters - acrylates and methacrylates. These are used singly or in combination, sometimes with other monomers producing soft, flexible elastomers in many forms including solutions, latexes, emulsions and reactive syrups. Acrylics are blended with vinyls, butadiene, and other acrylic rubbers. Polyacrylates, the lower acrylate polymers having glass transition points below room temperature, are typically soft and rubbery. Copolymers of ethyl acrylate with a few percent by weight of a chlorine-containing monomer such as 2-chloroethyl vinyl ether have exceptional elastomeric properties. Said acrylic material is amenable to being compounded with inorganic grits to form the present invention using one of the processes henceforth.

The present invention can be formulated by the following processes. A polymer of relatively low melting point is chosen from the aforementioned materials. For example, polyvinyl butyral can be calendered by two hot roll mills about six inches in diameter by one foot length each. Inorganic grit is added during the calendering process, normally a few passes would be required for thorough blending. The resulting hot dough is then pressed onto a pancake shaped mold with a precut plastic turf placed therein. Upon cooling the integrated piece of the present invention is formed. An alternative process is casting. A polymer is selected from the aforementioned materials and prepared in one of the following liquid forms, either a solution, or latex or emulsion or reactive syrup. The liquid mass is agitated while inorganic grits are being added. The resulting slurry is then cast onto a pancake shaped mold with a plastic turf placed therein. Using other shape molds, other shapes of turf may be created.

As the bottom compliant layer 3 consists of a heavy grit bonded with a lightweight polymer, this results in a heavy structure which is fairly hard in compression yet easily cut through with a knife, especially so when the grass guard 1 is laid flat against the lawn and cutting starts from the top plastic sheet 2. Uniform dispersion of the heavy grit inside the bottom compliant layer 3 makes for easier installation trimming yet. Whereas, the grass guard 1 is easily bent and stays plastically compliant afterwards. Thus, the grass guard 1 will closely conform to the contour of the ground under a variety of conditions like ground sealing and trafficking objects. Additionally, smaller device thickness and simplicity of manufacturing process are made possible. This means lower product cost and easier installation since there is less depth to dig in the ground to seat the grass guard 1.

Geometrically, the present invention employs a two level interference design. The diameter of the center hole 4 of the top plastic sheet 2, which is only slightly stretchable, is made slightly smaller than the diameter of the sprinkler head 8 (e.g., $\frac{1}{16}$" to $\frac{1}{8}$"). Whereas, the diameter of the center hole 4 of the bottom compliant layer 3 is made quite a bit smaller than the diameter of the sprinkler head 8 (e.g., $\frac{1}{4}$" to $\frac{1}{2}$"). Thus, the center hole 4 of the bottom compliant layer 3 is self adjusting due to its compliance. The result is good conformance to the sprinkler head 8 regardless of the details of its side profile. This means that a much thinner structure can be used which reduces product cost and depth of digging for installation. By the same token, substantial tilting of the device during installation is not necessary to stretch it over the sprinkler head 8. A simple tool like a screw driver can stretch the center hole 4 of the bottom compliant layer 3 over the sprinkler head 8. To avoid possible delamination between the two layers during stretching, the center hole 4 of the bottom compliant layer 3 is shown to flare toward the top of the device such that it completely covers the center hole of the top layer, as shown in FIG. 1B. Finally, to service the sprinkler head 8 or the piping below of the sprinkler system, all that is required is a simple operation of slight digging to reveal the edge of the grass guard 1 followed by a forced lifting off.

The outside rim 5 of the device should not fray under a variety of trafficking objects like people or lawn mower. Since the device is relatively thin, it is sufficient to have a top rounded corner portion with the rest of the profile being vertical as the body of the grass guard 1 is virtually completely driven into the ground during installation. Additionally, to prevent edge delamination between the layers 2 and 3 from trafficking objects the outside rim 5 of the bottom compliant layer 3 is shown to have a raised skirt such that it completely encircles the edge of the top plastic sheet 2. See FIG. 1B.

The installation accessories, shown in FIGS. 1C and 1D, consist of a bag of adhesive 12 (FIG. 1C) and a hammering board 6 (FIG. 1D). The adhesive 12 will be used to bond the center hole 4 of the grass guard 1 to the sprinkler head 8. The hammering board 6 will be used to flatten the top surface of the grass guard 1 flush against the ground in the final installation step. More detailed description of them will be given later.

The first step of installation of the grass guard 1 over an existing sprinkler head 8 on the lawn 9 is illustrated in FIG. 2. The grass guard 1 is placed upon the sprinkler head 8. The user would then mark and clear a grass free area 11 adjacent to the sprinkler head 8. The cleared area 11 should be about the same depth but slightly larger in size as the grass guard 1. To make it substantially easier, the user should first water the lawn 9 in the immediate vicinity of the sprinkler head 8 till the ground is just softened with moisture.

Next, the user centers the grass guard 1 on the sprinkler head 8, mark and trim off the excess portion with a knife according to the location of the sprinkler head 8 on the lawn 9 (center, edge or corner). This is illustrated in FIG. 2 for a sprinkler head 8 located at the edge of lawn 10. Notice that, although the grass guard 1 consists of materials highly resistant to extreme weather and mechanical impact like foot and lawn mower traffic, the materials are easily cut through with a knife. This is especially so when the grass guard 1 is laid flat against the lawn 9 and cutting starts from the top plastic sheet 2. This makes possible easy and flexible installation of the grass guard 1.

Figure 4:
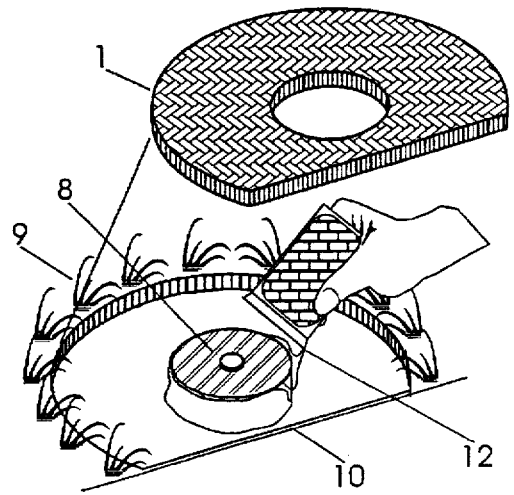
FIG. 4 illustrates isometrically the third step of the installation procedure wherein an installation material is being applied.

The user then wipes the sprinkler head 8 dry and applies the bag of adhesive 12 around the neck of the sprinkler head 8. See FIG. 4. The adhesive 12 should provide a high bonding strength between the sprinkler head 8 and the center hole 4 of the grass guard 1 after curing and be weather resistant. Additionally, the curing time should be appropriately long for convenient installation but not too long to hinder the resumption of normal sprinkler operation.

Figure 5:
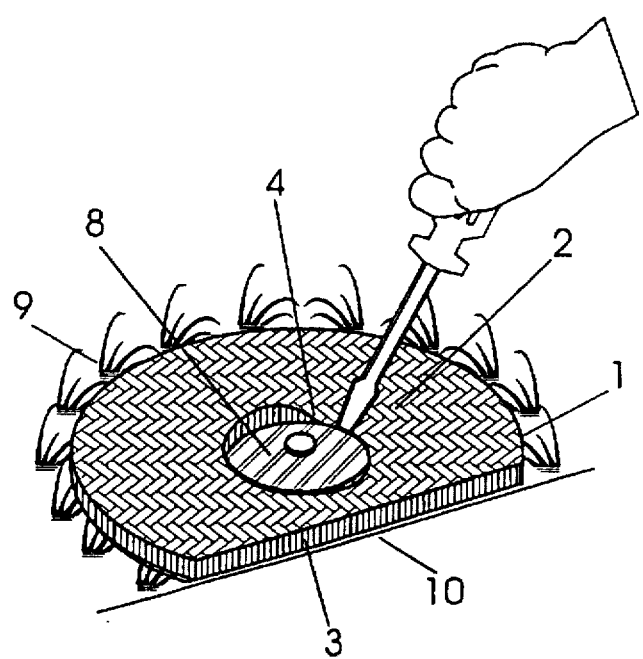
FIG. 5 illustrates isometrically the fourth step of the installation procedure wherein a common tool is being used.

Next, the user places the grass guard 1 upon the sprinkler head 8 and, with a flat blade screw driver, works to stretch the center hole 4 over the sprinkler head 8. See FIG. 5. Once the ring of adhesive 12 cures a very strong bond is formed between the center hole 4 of the grass guard 1 and the neck of the sprinkler head 8. This guarantees the absence of any gap around the head through which vegetation will eventually grow defeating the function of the grass guard 1. The gap could be there right after installation simply due to the significant size variation around a design nominal of the heads made by different manufacturers or in cases where sprinkler heads of other shapes are encountered (e.g., rounded triangular). Another cause is the long-term stretching of the center hole 4 from repeated foot and lawnmower traffic. This is especially serious at the corner or edge of the lawn 9 where there is not much material of the grass guard left around the neck of the sprinkler head 8 after trimming to shape.

Figure 6:
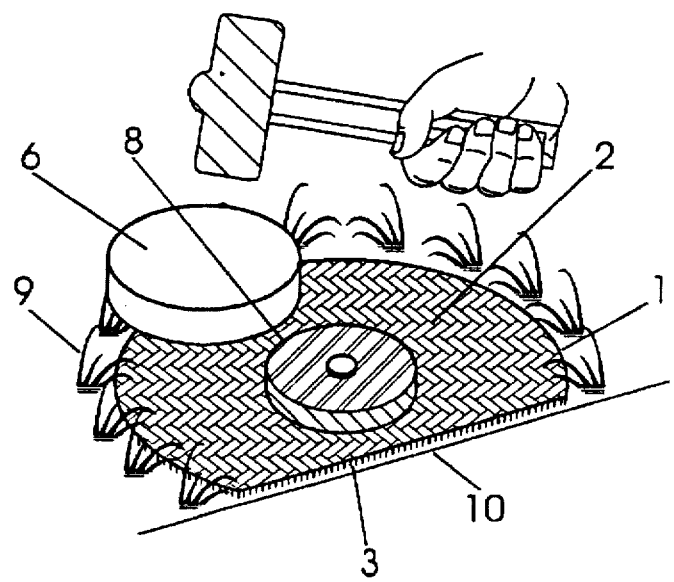
FIG. 6 illustrates isometrically the last step of the installation procedure wherein an installation tool and a common tool are being used together.

During the final step (FIG. 6), the user hammers around the top surface and edge of the grass guard 1 to make it even and flush with the ground. To avoid damage to the grass guard 1 under such high impact, it is important to use a hammering board 6 to reduce the pressure on the grass guard 1. A disk made of relatively thick multi-layered plywood is low cost and found to work well as the multi-directional grain structure resists total splitting of the board under impact. Of course, other materials and shapes can be used as well as long as equivalent functionality is achieved. As remarked before, in cases where the ground was already softened from pre-watering the grass guard 1 will be easily driven into and made flush with the ground. Simultaneously, a quality seam between the periphery of the grass guard 1 and the ground is formed preventing edge fraying later. Here (see FIG. 2), the cleared area 11 did not have to be depressed, thereby the installation was simplified even further. Finally, some waiting time should be allowed before watering. This allows time for the adhesive 12 to cure to strength.

It is further conceived that, the function of the present invention is applicable to the prevention of growth of grass or other vegetation next to any physical objects with the proper tailoring of geometry and choice of associated manufacturing process. For example, by proper choice of the inside and outside diameter of the present invention and/or with a radial slit cut it can be used for objects like fire hydrants, sign poles and trees. By proper choice of the shape and size of the present invention it can be used for utility boxes. By using a strip geometry, the present invention can be used for the edge of lawn or other vegetation bordering fences or concrete sidewalks. Here, for low production cost with high throughput it would be more appropriate to adopt a roll to roll manufacturing process.

With respect to the above description, it should be realized that the variations in materials, form, shape, size, function and manner of operation, assembly and use readily apparent to those skilled in the art, and all equivalent relationships to those illustrated and described in the specification herein are intended to be covered by the present invention. Therefore, the foregoing should be understood as only illustrative of the principles of the invention. As numerous modifications will readily occur to those skilled in the art, the scope of the present invention is not limited to the exact construction and operation shown and described herein, and accordingly, covers all suitable modifications and equivalents herefrom.

We claim:

1. A vegetation guard for forming a vegetationless border around a perimeter of an object, said vegetation guard comprising:
   a first layer formed of a resilient, plastically compliant polymeric material having a high density particulate material dispersed therein, said first layer being impermeable to growth of plant matter,
   and a second layer embedded within a top surface of said first layer, said second layer having a texture and coloration simulating natural grass, said first layer having a raised outer edge surrounding a periphery of said second layer, said first layer having a first opening having a first diameter therethrough, said second layer having a second opening of a second diameter which is different than said first diameter therethrough, said second opening being concentric with said first opening, said first layer having a raised inner edge extending within said second opening.

2. The vegetation guard of claim 1 wherein said second layer is bonded to said top surface of said first layer.

3. The vegetation guard of claim 1 wherein said second layer is formed of a woven polymeric material simulating natural grass.

4. The vegetation guard of claim 1 wherein said first layer and said second layer combine to form a sheet-like structure.

5. The vegetation guard of claim 1 wherein said second diameter is larger than said first diameter.

6. The vegetation guard of claim 1 wherein said first layer is more resilient than said second layer, whereby said first opening is stretchable from said first diameter to a diameter larger than said first diameter to fit around said object.

7. The vegetation guard of claim 1 wherein said first layer and said second layer combine to form a sheet-like structure having an upper surface and a lower surface and having an outer periphery which is generally circular in shape.

8. The vegetation guard of claim 1 wherein the material of said first layer and the material of said second layer are selected to be easily cut with a blade of a knife, whereby said vegetation guard is easily cut with a knife to have an outer periphery conforming with a desired installation area.

9. The vegetation guard of claim 1 wherein said high density particulate material is dispersed within said resilient, plastically compliant polymeric material by calendering a mixture of said resilient, plastically compliant polymeric material and said high density particulate material between hot rollers, and said second layer is bonded to said first layer by pressing the hot, calendered mixture of said resilient, plastically compliant polymeric material and said high density particulate material into a mold containing a sheet of material which forms said second layer.

10. The vegetation guard of claim 1 wherein said high density particulate material is dispersed within said resilient, plastically compliant polymeric material by mixing said high density particulate material in a liquid form of said resilient, plastically compliant polymeric material selected from the group consisting of a solution, or an emulsion or a reactive syrup of said resilient, plastically compliant polymeric material and said second layer is bonded to said first layer by casting the mixture of said resilient, plastically compliant polymeric material in a liquid form and said high density particulate material into a mold containing a sheet of material which forms said second layer.

11. The vegetation guard of claim 1 wherein said vegetation guard is formulated using at least one chosen from the group consisting of lower acrylate esters and methacrylate esters in a form chosen from the group consisting of solutions, latexes, emulsions and reactive syrups.

12. The vegetation guard of claim 1 wherein said vegetation guard is formulated using a modified blend of said lower acrylate esters and methacrylate esters by at least one chosen from the group consisting of vinyl ether, plasticized vinyl chloride, styrene, butadiene; polyisoprene, nitrile rubber, butyl rubber, neoprene, natural rubber, silicone-polyether, epichlorohydrin rubber, fluorocarbon elastomers, chlorosulfonated polyethylene, and polyurethane.

13. The vegetation guard of claim 1 wherein said vegetation guard is formulated using at least one chosen from the group consisting of vinyl and vinylidene chloride, polymers and copolymers, butadiene-acrylonitrile copolymers, styrene-butadiene copolymers, terpolymers of butadiene, styrene and vinyl pyridine, polymers and copolymers of chloroprene, dichlorobutadiene, polymers and copolymers of ethylene-vinyl acetate, polyvinyl alcohol, polyamide, polyvinyl butyral, polyurethane, silicone, epichlorohydrin rubber, and elastomeric terpolymers of ethylene, propylene and diene monomers EPDM.

14. The vegetation guard of claim 1 wherein said vegetation guard is in the form of an elongated strip.

15. The vegetation guard of claim 1 wherein said vegetation guard further comprises an adhesive for adhering said vegetation guard to said objects, thereby preventing vegetation growth between said vegetation guard and said object.

* * * * *